United States Patent Office 2,946,416
Patented July 26, 1960

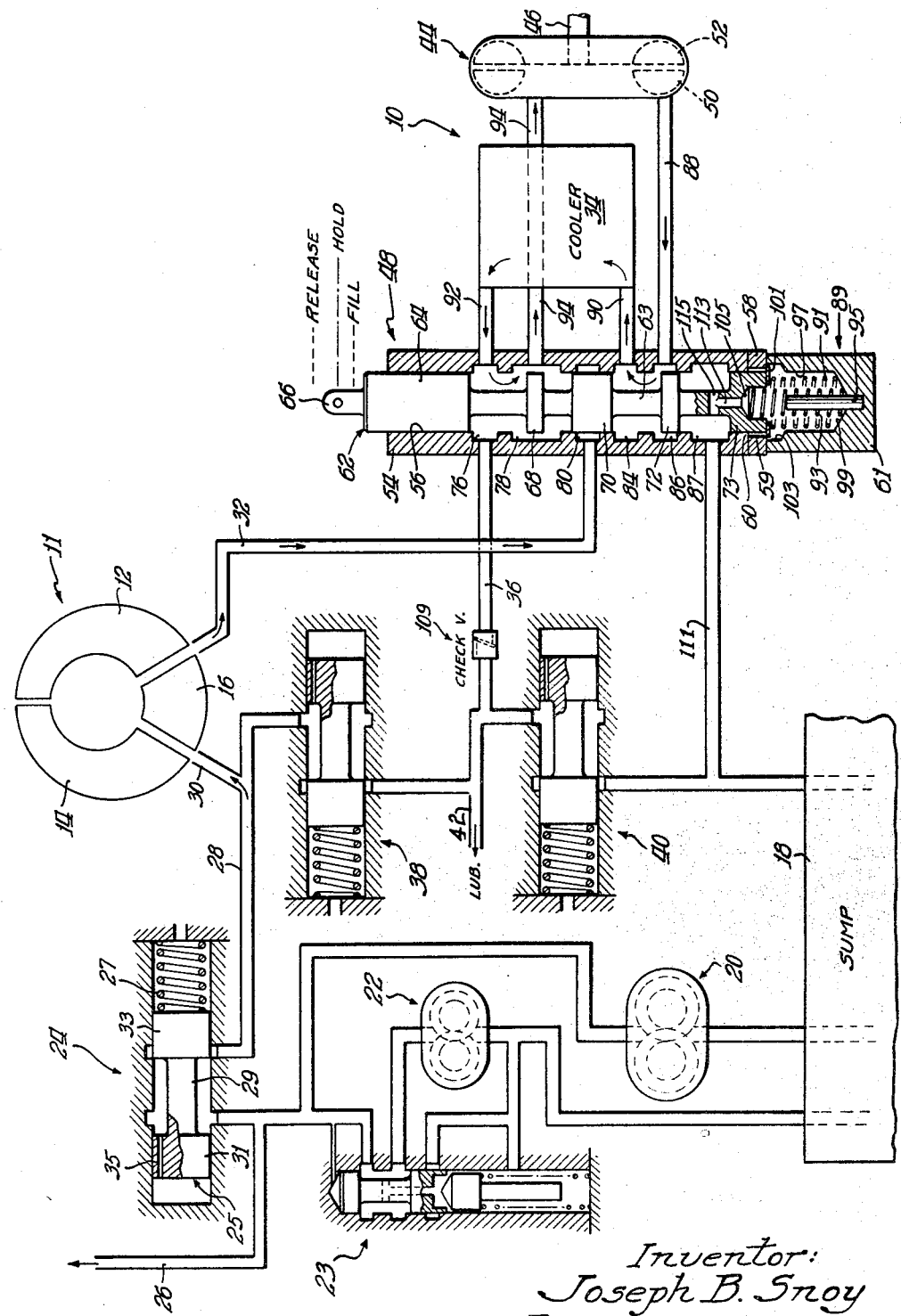
July 26, 1960 — J. B. SNOY — 2,946,416
HYDRAULIC RETARDER CONTROL
Filed Jan. 7, 1959
Inventor:
Joseph B. Snoy
By: Francis T. Drumm, Atty.

2,946,416
HYDRAULIC RETARDER CONTROL

Joseph B. Snoy, Rockford, Ill., assignor to Borg-Warner Corporation, Chicago, Ill., a corporation of Illinois Filed Jan. 7, 1959, Ser. No. 785,459

11 Claims. (Cl. 192—4)

This invention relates to hydraulic retarders and more particularly to a control for a hydraulic retarder intended for use in braking vehicles equipped with automatic transmissions.

Heretofore, hydraulic retarders have been proposed which utilized hydraulic fluid from the automatic transmissions in a chamber having fixed and rotatable vanes for vehicle braking. These devices commonly have a fluid cooler in series with the retarder so that in the event that the fluid flowing to the retarder is throttled, the fluid flowing through the cooler is also throttled. The disadvantages of this arrangement are apparent; in devices of this type the amount of fill cannot be effectively throttled because of the excessive heat developed in the oil being circulated. As a result, these retarders have to be operated only when the retarder is completely full.

A primary object of the invention is, therefore, to provide a control for a hydraulic retarder wherein the fill of the retarder may be accurately controlled for any predetermined degree of braking from minimum to maximum.

A further object of the invention is to provide a hydraulic retarder control in which the retarder and the cooler are in a closed loop system to afford constant cooling of the hydraulic fluid during braking.

Another object of the invention is to provide a hydraulic retarder of the stated type wherein the hydraulic fluid is circulated during braking by the pressure head developed by the impeller of the retarder.

A further object of the invention is to provide a hydraulic retarder in accordance with the preceding objects in which the amount of braking varies in accordance with the degree of filling of a closed loop system.

Another object of the invention is to provide a hydraulic retarder of the mentioned character having a valve which is manually actuatable to a "fill" position which may be maintained for a predetermined period of time to afford a predetermined degree of braking.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein the sole figure of the drawing is a schematic view of a retarder control system made in accordance with the present invention and shown in conjunction with a schematic representation of portions of a hydraulic transmission system.

Referring to the drawing, reference numeral 10 indicates the vehicle brake system of the present invention illustrated in conjunction with a portion of a control system of a hydraulic transmission (not shown) which includes a torque converter 11 having an impeller 12, a turbine 14 and a stator 16. Hydraulic fluid is supplied to the converter 11 from a sump 18 by means of a pump 20 which corresponds to the front pump of the automatic transmission or an output pump 22, which corresponds to a rear pump of the automatic transmission, through a main regulating valve 24, which in the present instance, regulates the pressure to the conventional hydraulic clutches of the transmission by way of conduit 26 to approximately 110 p.s.i. The pumps 20 and 22 are shown as arranged in parallel relation, the pump 22 being adapted to supply fluid for the transmission when push-starting and the pump 20 being adapted to supply fluid pressure to the transmission when the vehicle engine is operating. In the latter event, the output of the pump 22 is bypassed to sump by a valve 23. It will be appreciated that the disclosure of the present vehicle braking system is illustrative only and that this system may be entirely separate from a hydraulic transmission so long as means are provided to pressurize the fluid.

The main regulating valve 24 includes a slidable plunger 25 biased to the left, as viewed in the drawing, by means of a spring 27. The plunger 25 has a spindle 29 maintaining lands 31 and 33 in spaced relation. A bleed hole 35 is formed in the land 31 to permit the flow of fluid from the area surrounding the spindle 29 to the left side of the land 31. When the fluid pressure on the left side of the land 31 exceeds a predetermined value the plunger 25 is urged to the right, as viewed in the drawing, against the force of the spring 27. In this instance, fluid may be discharged from the valve 24 through a conduit 28 so that the fluid pressure between the pumps 20 and 22 on the valve 24 is maintained at approximately 110 p.s.i.

Fluid is supplied to the converter 11 through the conduit 28 and a conduit 30 at a pressure of approximately 80 p.s.i. This pressure is maintained by a pressure regulating valve 38, the operation of which is similar to that of valve 24 and need not be described in detail. The hydraulic fluid, during the normal operation of the transmission, normally flows from the converter 11 to a cooler 34, which is preferably of the secondary heat exchange type and desirably utilizes the vehicle engine cooler as a primary fluid. This fluid flows to the cooler 34 by means of a conduit 32 and returns to the converter sump 18 by means of a conduit 36. As is hereafter apparent, the cooler 34 is utilized to cool the fluid from the converter 11 only during normal operation of the vehicle.

Positioned between the sump 18 and the regulating valve 38 is a regulating valve 40 set to maintain the pressure of oil in lubricant line 42 at approximately 10 p.s.i. Fluid in excess of that required to maintain the respective pressure flows back to sump in conventional manner. The operation of the valve 40 is similar to that of the valves 24 and 38 and will not be further described.

According to the present invention a hydraulic retarder 44 is connected to a driven shaft 46 and fluid is selectively received through it from the converter 11 through the medium of a control valve 48 which is movable by means of a suitable pedal (not shown) to the "fill" position. This control valve 48 may then be retracted to the "hold" position to terminate communication between the converter 11 and the cooler 34 while the retarder 44 is in operation. In addition, as will be apparent, the valve 48 sequesters a portion of the fluid in a closed loop system between the retarder 44 and the cooler 34. It will be obvious that the valve 48 need not be throttled as is required of control valves of heretofore known retarders. As a result, the desired degree of retardation is always readily obtainable.

The retarder 44 is shown as including a fixed vaned reaction plate 50 in closed coupling relation to a rotatable vaned impeller 52 connected to the shaft 46. The kinetic energy of the shaft 46 is converted to heat in the fluid in the retarder 44 and the heat is dissipated by the cooler 34 as will be apparent.

The control valve 48 is shown as including a casing 54 having a central bore 56 and provided with an end plate 58 having a bore 59 slightly exceeding the bore 56 in diameter and defining a shoulder 60. An end cap 61, hereinafter described in detail is secured by any suitable means to the plate 58 and the casing 54. Slidably received within the bore 56 is a plunger 62 having at one end a base section 64 provided with an ear or lug 66 for connection by a suitable link or the like to the pedal desirably positioned near a foot of the vehicle operator. The plunger 62 further includes a central spindle 63, spaced control lands 68, 70 and 72 and a base section 73 at the opposite end. Preferably the elements 64, 68, 70, 72 and 73 are integrally formed with the spindle 63. The casing 54 is provided with longitudinally spaced grooves 76, 78, 80, 84 and 86, and 87 extending radially outwardly from the bore 56.

As previously pointed out, fluid normally circulates between the converter 11 and the cooler 34 while the vehicle is in operation. When retardation is desired, this fluid circulation is interrupted by the valve 48 when the plunger 62 is moved to the "fill" position. The plunger 62 may be held in the "fill" position for a predetermined period of time to obtain a wide range of braking. After the desired degree of fill is completed, the plunger 62 is released to the "hold" position in which the fluid flows in a closed loop circuit between the retarder 44 and the cooler 34. When retardation is no longer desired, the plunger 62 is released to the "release" position. When the plunger 62 is in the "release" position, the retarder 44 is emptied by the pumping action of the impeller, this effecting a low pressure condition in the retarder which facilitates filling when the plunger 62 is again moved to "fill" position. The positioning of the plunger 62 in either the "fill" or the "hold" position is determined by a detent assembly 89 described hereinafter in detail.

The plunger 62 is illustrated in the "hold" position in which retardation of the vehicle occurs. In that position fluid communication is afforded between the retarder 44 and the cooler 34 by means of a conduit 88 extending between the retarder 44 and the groove 86, the bore 56, the groove 84 and the cooler 34, a conduit 92 extending between the cooler 34 and the groove 76, the groove 76, the bore 56, the groove 78 and a conduit 94 extending between the groove 78 and the retarder 44. The control lands 68, 70 and 72, in cooperation with the base 64, thus form a closed loop system for fluid driven by the impeller 52 of the retarder 44 through the cooler 34 and back to the retarder. The detent assembly 89 includes a first helical spring 91 and a second helical spring 93 disposed concentrically with respect to the helical spring 91. The helical spring 93 is of less diameter than the spring 91 and is disposed in surrounding relation to a pin 95 mounted in the end cap 61 in a bore 97 which is defined at one end by a substantially frusto-conical shoulder 99 against which abuts one end of each of the springs 91 and 93. The opposite end of the spring 91 engages an annular plate 101 which is normally urged into abutment with the confronting face of the annular plate 58, the annular plate 101 being received in a counter bore 103 and being movable by base section 73 against the force of the spring 91 when the plunger 62 is in "fill" position. The opposite end of the spring 93 is received in a bore 105 in the adjacent side of the base section 73. It will thus be seen that both of the spring 91 and the spring 93 are compressed when the plunger 62 is in "fill" position, the bottoming of the plate 101 against the adjacent surface of the plate 58 provides a detent for the "hold" position and the spring 93 is capable of biasing plunger 62 to the "off" position in which free communication is afforded between the converter 11 and the cooler 34. When the valve 48 is in the "off" position, as will be understood, the retarder 44 is evacuated by the pumping action of the impeller 52.

In operation, the plunger 62 is manually moved to the "fill" position. In this position the base section 73 moves the plate 101 to its terminal position in which the spring 91 is fully compressed. The control lands 68, 70 and 72 are moved simultaneously to positions in which fluid may flow from the converter 11 to the retarder 44 by means of conduit 32, groove 80, bore 56, groove 78, and conduit 94. This fluid is continuously cooled by circulating from the retarder 44 to the cooler 34 by means of the conduit 88, the groove 86, the bore 56 and the conduit 90. Flow is then afforded from the cooler 34 by way of conduit 92, the groove 76, the bore 56, the groove 78, and the conduit 94 to the retarder. As pointed out previously, the plunger 62 may be held in "fill" position for a predetermined period of time of retardation, within limits of course. It will be apparent that the entire amount of fluid utilized for retardation is subject to the cooling action at all times during retardation when the plunger 62 is in "hold" position.

When retardation is no longer required, the plunger 62 is released by the operator and is moved to an inoperative position by means of spring 93. In this "off" position fluid flows from the converter 11 to the cooler 34 by means of the conduit 32, the groove 80, the bore 56, the groove 84 and the conduit 90. It is contemplated that the fluid be transmitted to the cooler 34 at a pressure of approximately 45 p.s.i. and be discharged therefrom at a pressure of approximately 5 p.s.i. to be transmitted to the sump 18 by means of the conduit 36. It will be noted that the conduit 36 communicates with the fluid system of the hydraulic transmission upstream of the pressure regulating valve 40 which controls the fluid pressure to approximately 10 p.s.i. In order to prevent backing up of the fluid to the oil cooler while the plunger 62 is in the "hold" position a check valve 109 is interposed in the conduit 36. As the plunger 62 is moved to "off" position, the fluid in the retarder 44 is discharged to the sump 18 by means of the conduit 88, the groove 86, the bore 56 and a conduit 111.

To facilitate the operation of the detent assembly 89, the base section 73 is provided with a central bore 113 communicating with a radial passage 115 in the spindle 63. The passage 115, in all positions of the plunger 62, communicates with the sump 18 by means of the conduit 111, as will be apparent.

The above described vehicle braking system exhibits important advantages over retarders heretofore known. For example, the amount of fluid flowing through the cooler 34 during retardation is not throttled in any way. By contrast, after a predetermined quantity of fluid is admitted to the closed loop system and the plunger 62 moves to the "hold" position, this fluid is continuously circulated between the retarder and the cooler as long as braking action is desired. By this arrangement, sufficient cooling is provided to dissipate all of the heat generated in the retarder during vehicle braking even under adverse conditions.

While I have described my invention in connection with certain specific constructions and arrangements, it is to be understood that this is by way of illustration and not by way of limitation and the scope of my invention is defined solely by the appended claims which should be construed as broadly as the prior art will permit.

I claim:

1. A hydraulic retarder control apparatus comprising a source of fluid under pressure, control means for reducing the pressure of said fluid to a predetermined value, a hydrodynamic coupling, a heat exchanger adapted to cool the fluid in said hydrodynamic coupling, a hydrodynamic retarder comprising a rotor and a stator, and control means for selectively sequestering a portion of the fluid of said hydrodynamic coupling into a closed loop system affording communication between said retarder and said cooler.

2. In a hydraulic transmission, having a hydrodynamic coupling, means providing a source of fluid under pressure to said coupling, a heat exchanger, means providing communication between said coupling and said heat exchanger, a hydrodynamic retarder adapted to be connected to a rotatable element, and control means for selectively filling said retarder from said coupling, said control means being operative to divert a portion of the fluid from said coupling into a closed loop circuit including said retarder and said cooler.

3. In a hydraulic transmission having a hydrodynamic coupling, a sump, a pump for transmitting fluid under pressure from said sump to said coupling, a pressure regulator interposed between said pump and said coupling for controlling the pressure of fluid delivered to said coupling, a heat exchanger, a conduit connecting said coupling to said heat exchanger, a conduit connecting said heat exchanger to said sump whereby fluid flowing from said coupling to sump is cooled, the improvement comprising a hydrodynamic retarder having a rotor and a stator, and control means for selectively diverting a portion of the fluid from said first-named conduit into said hydrodynamic retarder and for effecting a closed loop circulation between said retarder and said heat exchanger.

4. In a hydraulic transmission having a hydrodynamic coupling, a sump, a pump for transmitting fluid under pressure from said sump to said coupling, a pressure regulator interposed between said pump and said coupling for controlling the pressure of fluid delivered to said coupling, a heat exchanger in fluid communication with said coupling for cooling fluid from said coupling, said heat exchanger being operable to discharge the fluid to said sump, the improvement comprising a hydrodynamic retarder having a rotor adapted to be connected for rotation with a rotatable element of the transmission and a stator, and control means for selectively diverting a portion of the fluid from said coupling to said retarder, said control means including a valve operative in one position to fill said retarder, in another position to effect a closed loop circulation between said retarder and said heat exchanger and in another position to afford discharging of the fluid in said retarder to said sump.

5. In a hydraulic transmission having a hydrodynamic coupling, a sump, a pump for transmitting fluid under pressure from said sump to said coupling, a pressure regulator interposed between said pump and said coupling for controlling the pressure of fluid delivered to said coupling, a heat exchanger in fluid communication with said coupling for cooling fluid from said coupling, said heat exchanger being operable to discharge the fluid to said sump, the improvement comprising a hydrodynamic retarder having a rotor adapted to be connected for rotation with a rotatable element of the transmission and a stator, control means for selectively diverting a portion of the fluid from said coupling to said retarder, said control means including a valve having control lands spaced in a manner to afford communication between said heat exchanger and said coupling in one position, to afford filling of said retarder in another position and to afford discharging of fluid from said retarder in still another position.

6. In a hydraulic transmission having a hydrodynamic coupling, a sump, a pump for transmitting fluid under pressure from said sump to said coupling, a pressure regulator interposed between said pump and said coupling for controlling the pressure of fluid delivered to said coupling, a heat exchanger in fluid communication with said coupling for cooling fluid from said coupling, said heat exchanger being operable to discharge the fluid to said sump, the improvement comprising a hydrodynamic retarder having a rotor adapted to be connected for rotation with a rotatable element of the transmission and a stator, control means for selectively diverting a portion of the fluid from said coupling to said retarder, said control means including a valve having a casing provided with a bore, a plunger slidably disposed in said bore and provided with a plurality of spaced control lands to afford fluid communication between said coupling and said heat exchanger in one position, fluid communication between said coupling, said retarder and said heat exchanger in another position and fluid communication between said heat exchanger and said retarder in still another position, and a detent assembly for indexing the several positions of said valve plunger.

7. In a hydraulic transmission, a hydrodynamic coupling, a fluid circuit for supplying fluid under pressure to said coupling, a heat exchanger in said fluid circuit for cooling the fluid, a hydraulic retarder having a rotor and a stator, said rotor being adapted to be connected to a rotatable element, and means for selectively providing fluid communication between said circuit and said retarder and sequestering a portion of the fluid from said circuit in a closed fluid circuit including said retarder and said heat exchanger so that the kinetic energy of the rotatable element is converted to heat.

8. In a hydraulic transmission, a hydrodynamic coupling, a fluid circuit for supplying fluid under pressure to said coupling, a heat exchanger in said fluid circuit for cooling the fluid, a hydraulic retarder having a rotor and a stator, said rotor being adapted to be connected to a rotatable element, and a valve for selectively providing fluid communication between said circuit and said retarder and sequestering a portion of the fluid from said circuit in a closed fluid circuit including said retarder and said heat exchanger so that the kinetic energy of the rotatable element is converted to heat, said valve having a casing formed with a bore, a plunger slidably mounted in said bore, means for indexing said plunger to a plurality of finite positions, said plunger having a plurality of lands in sliding engagement with the wall defining said bore, said casing being formed with a plurality of axially spaced annular grooves communicating with said bore, means affording fluid communication through certain of said grooves between said coupling and said heat exchanger in one position, between said coupling, said retarder and said heat exchanger in another position and between said retarder and said heat exchanger in a closed loop circuit in still another position.

9. In a fluid pressure system for automotive vehicles, a pump, a source of fluid, said pump being operable to transmit fluid under pressure from said fluid source to a point of utilization, said fluid being adapted to return to said fluid source thus forming a closed fluid circuit, a heat exchanger in said fluid circuit for cooling the fluid, a hydraulic retarder having a stator and a rotor adapted to be connected to a rotatable element of the vehicle, and means for selectively diverting a portion of the fluid to flow in a second fluid circuit including said heat exchanger and said retarder, said means including a valve having a casing formed with a bore, a plunger slidably arranged in said bore, a plurality of axially spaced grooves formed in said casing in communication with said bore, said plunger being formed with a plurality of spaced lands, means for indexing said plunger to a plurality of finite positions to restrict the flow of fluid to said first fluid circuit in one position and restrict the flow of fluid to said second circuit in another position.

10. A control valve for a fluid pressure system including a first fluid circuit having a source of fluid, a pump for transmitting fluid under pressure to a point of utilization in which heat is developed, a heat exchanger for removing the heat from the fluid, a hydraulic retarder, said control valve being operative in one position to feed fluid under pressure from said first circuit into a second circuit including said retarder for said heat exchanger, operative in another position to sequester a portion of the fluid in said second circuit and operative in another position to afford the release of fluid from said second circuit to said first circuit.

11. In a hydraulic transmission, a hydrodynamic coupling, a fluid circuit for supplying fluid under pressure to said coupling a heat exchanger in said fluid circuit for cooling the fluid, a hydraulic retarder having a rotor and a stator, said rotor being adapted to be connected to a rotatable element, and a valve for selectively providing fluid communication between said circuit and said retarder and sequestering a portion of the fluid from said circuit in a closed fluid circuit including said retarder and said heat exchanger so that the kinetic energy of the rotatable element is converted to heat, said valve having a casing formed with a bore, a plunger slidably arranged in said bore, means for indexing said plunger to a plurality of finite positions, said indexing means comprising a first helical spring characterized by a relatively low resistance to compression, one end of said first spring being received in a bore in said plunger and the other end of said spring being in abutment with a shoulder defined by a bore in said casing, a second helical spring received within said casing bore, means for maintaining a predetermined compression on said second spring, said plunger being movable successively from one position in which said first spring is uncompressed to a second position in which said first spring is compressed and to a third position in which both of said springs are compressed, said plunger having a plurality of lands in sliding engagement with the wall defining said bore, said casing being formed with a plurality of axially spaced annular grooves communicating with said bore, means affording fluid communication through certain of said grooves between said coupling and said heat exchanger in said one position, between said coupling, said retarder and said heat exchanger in said third position and between said retarder and said heat exchanger in a closed loop circuit in said second position.

References Cited in the file of this patent

UNITED STATES PATENTS

| | | |
|---|---|---|
| 2,827,989 | Christenson | Mar. 25, 1958 |
| 2,832,428 | Kelley et al. | Apr. 29, 1958 |
| 2,864,473 | Christenson et al. | Dec. 16, 1958 |